United States Patent [19]

Wert, III

[11] 4,287,482
[45] Sep. 1, 1981

[54] CW-PULSED LASER

[76] Inventor: John C. Wert, III, 3101 Kemp Rd., Dayton, Ohio 45431

[21] Appl. No.: 70,943

[22] Filed: Aug. 30, 1979

[51] Int. Cl.$^3$ ................................................ H01S 3/14
[52] U.S. Cl. ............................ 331/94.5 F; 331/94.5 P
[58] Field of Search .................... 331/94.5 F, 94.5 Q, 331/94.5 M; 332/7.51; 350/353–357

[56] References Cited

U.S. PATENT DOCUMENTS

| | | |
|---|---|---|
| 3,484,722 | 12/1969 | Baker, Jr. et al. ................... 332/4 |
| 3,497,286 | 2/1970 | Morton et al. ...................... 350/460 |
| 3,555,455 | 1/1971 | Paine ................................ 331/94.5 Q |
| 3,656,836 | 4/1972 | de Cremoux et al. ............... 350/460 |

Primary Examiner—William L. Sikes
Assistant Examiner—Léon Scott, Jr.
Attorney, Agent, or Firm—Donald J. Singer; Casimer K. Salys

[57] ABSTRACT

An apparatus for generating a spatially coherent laser beam having both CW and pulsed modes. The modes are generated in differing volumetric regions of a single gain medium excited by a continuous energy pump. The CW portion of the output beam passes from the gain medium through a partially transmissive output coupling. The pulsed modes in the output beam are created in the respective region of the gain medium when transition materials from a selected group are stimulated to undergo an abrupt change between their reflective and transmissive states. Either cavity dumped or Q-switched configurations can be created by selective and patterned location of the transition materials at the ends of the gain medium. Symmetric organization of the volumetric regions within the gain medium allows temporal superposition of the two modes while maintaining spatial distinctiveness within the laser beam generated.

6 Claims, 9 Drawing Figures

CW-PULSED LASER

RIGHTS OF THE GOVERNMENT

The invention described herein may be manufactured and used by or for the Government of the United States for all governmental purposes without the payment of any royalty.

BRIEF SUMMARY

The present invention is directed to an apparatus for generating a spatially coherent laser beam which has continuous wave (CW) and pulsed modes temporally superimposed. The opposite ends of a laser grain medium are optically terminated with patterned surfaces consisting of highly reflective, partially reflective and transitional areas. The reflective areas are conventional in structure and operation, while the areas of transitional material are unique in their ability to alternate abruptly between highly transmissive and highly reflective states in response to external stimuli.

When pumped by a continuous energy source the gain medium transmits a CW laser beam from the output coupling end for the optical area not subject to transition. The areas defined by the transitional material, on the other hand, transmit a pulse upon transition of the material between states. In the cavity dumped configuration, the transition material is located at output coupling end of the gain medium. To operate in the Q-switched configuration the transition material is located at the opposite end of the gain medium.

The patterns attributable to the CW and pulsed operating areas are aligned in substantial symmetry to confine the reflective focusing of each of the two modes within distinct regions of the gain medium.

DETAILED DESCRIPTION

Figure 1:
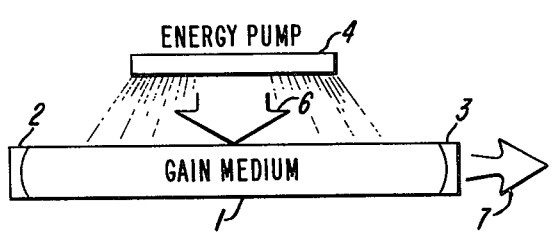
FIG. 1 schematically depicts a laser system.

Directing attention to FIG. 1, there appears a laser beam generator of conventional form to which the invention pertains. As shown in the figure, it comprises gain medium 1, reflecting surface 2, output coupling 3 and energy pump 4. Conventionally, energy 6 is converted into a laser beam, 7, having CW or pulsed modes depending on the pump characteristics and actuation means of output coupling 3. The invention differs from that in the art in that the CW and pulse modes are generated within the same gain medium and are temporally superimposed in laser beam 7.

Figure 2:
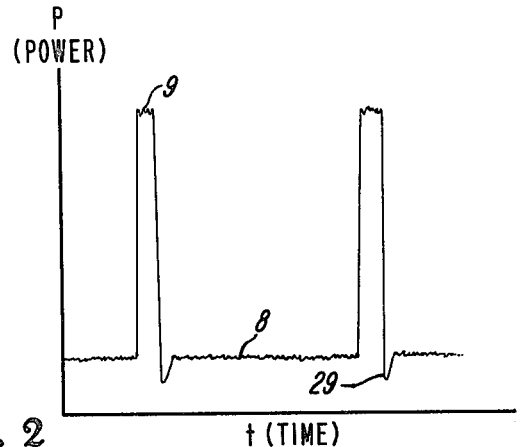
FIG. 2 contains a time plot of cumulative laser output power.

The time-variable cumulative power conveyed by beam 7 is shown by the plot in FIG. 2. Lower level 8 represents the level of power transmitted in the laser beam during the CW operating mode. The high amplitude peaks, 9, are attributable to the short duration pulses of laser power superimposed upon the CW level, together comprising the cumulative instantaneous power transmitted in the laser beam. The magnitudes of the signals depicted in FIG. 2 are represented in qualitative rather than quantitative terms.

The forthcoming description relates to an embodiment by which the configuration operates in a mode analogous to cavity dumping. Nevertheless, the features of the invention are not so restricted. Variations in structure make the invention amenable to other modes, as will be addressed hereafter.

Figure 3:
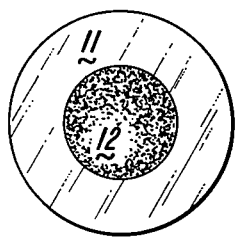
FIGS. 3-5 schematically show various spatial patterns for the CW and pulsed modes.

Consider the laser system described with reference to FIG. 1 having a pattern such as depicted in FIG. 3 over the face of output coupling 3, viewed along the longitudinal axis of the gain medium. Outer area 11 is partially transmissive, and as such, defines the area passing the CW mode of the laser beam. Inner area 12 constitutes the segment of output coupling 3 coated with transitional material, one which is capable of abrupt changes between highly reflective and substantially transmissive states. Thus, inner region 12 defines the area through which the laser pulse propagates upon stimulation of the transitional material into its transmissive state. From the foregoing, one recognizes that the pattern of the output coupling defines the profile of the CW and pulse modes in the laser beam.

Figure 4:
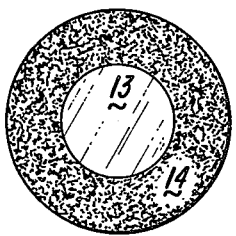

FIG. 4 is the compliment of FIG. 3, in that the CW mode energy radiates from inner area 13 while the pulse mode passes through outer region 14 and thereby spatially encloses the CW segment of the laser beam.

Figure 5:
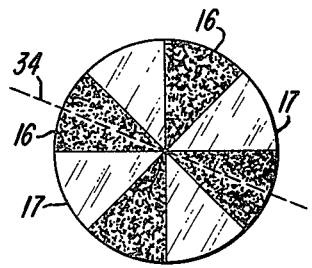

Though the beam profiles generated by the modulators depicted in FIGS. 3 and 4 describe concentric cylindrical areas of CW and pulsed mode operation, the concept underlying the invention is not so circumscribed. For instance, consider the geometric pattern of the "pie shaped" areas in FIG. 5. Thus, artisans will recognize that the embodiments in FIGS. 3-5 are mere examplars, and as such, make no attempt to encompass the broad diversity of patterns which fall within the purview of the invention. Constrains as to the pattern shapes will be addressed at a later point.

Figure 6:
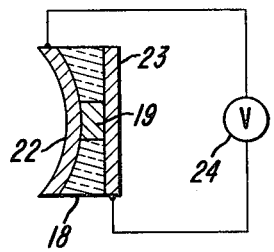
FIG. 6 shows a cross-sectional schematic of a thin film structure for an output coupling.

Directing attention to FIG. 6, there appears in the figure an embodiment of output coupling 3 for use with a cavity dumped pulsing configuration and having the pattern of FIG. 3. The output coupling depicted is comprised of partially transparent mirror 18 and transitional material crystal 19 sandwiched between intermediate grid layers 22 and 23 of optically transparent but electrically conductive materials. Examples of such latter materials include $In_2O_3$ and Sb for use in the infrared region of the spectrum. Voltage source 24, when connected to layers 22 and 23, impresses an electric field across transitional material crystal 19 to cause alterations in phase between reflective and transmissive states. As shown, the face of output coupling 3 confronting gain medium 1 incorporates a concave curvature to refocus reflected energy. CW mode energy passes through the peripheral area of the coupling depicted in FIG. 6. The pulsed mode of the laser beam passes through the center region of the output coupler when transitional material crystal 19 is stimulated into its transmissive state.

The group of transitional materials particularly suited to performing the abrupt phase transition described above includes VO, $VO_2$, $V_2O_3$, $V_3O_5$, $V_4O_7$, $V_5O_9$, $V_6O_{11}$, $V_7O_{13}$, $V_8O_{15}$, $Ti_2O_3$, $Ti_4O_7$, $NbO_2$, $FeSi_2$, $VO_2NbO_2$, $V_{1-x}Mo_xO_2$, $VO_2-TiO_2$, $V_2O_3-Ti_2O_3$, $V_{1-x}Ge_xO_2$, $V_{1-x}Nb_xO_2$, $V_{1-x}Cr_xO_2$, $(Cr_xV_{1-x})_2O_3$ and $V_{1-x}Ti_xO_2$. The oxide compounds forming this group are generally characterized by their narrow 3d bands and energy gaps in the range of 0.1 eV to 0.4 eV. As required by the application, they undergo abrupt phase transitions between metallic, reflective, states and non-metallic, transmissive, states when stimulated.

Materials from this group may be fabricated as individual crystals, as embodied in FIG. 6, or may be deposited in thin film layers. Furthermore, the stimuli necessary to force a transition between states is not limited to electric fields, but rather, encompasses other mechanisms such as thermal or hydrostatic pressure variations.

Figure 7:
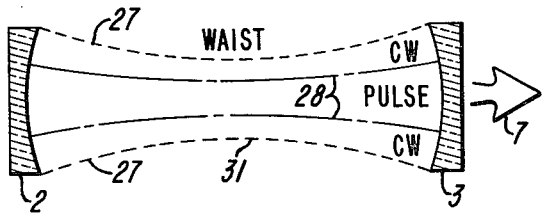
FIG. 7 schematically depicts the optical envelopes of various regions within a gain medium for central area pulsed operation.

FIG. 7 schematically depicts the optical organization within a gain medium, and for purposes of the forthcoming elaboration presumes the output coupling arrangement shown in FIG. 3. Dashed lines 27 represent the optical envelope created by refocusing reflections from laser elements 2 and 3. The CW mode contribution to laser beam 7 is a function of the gain medium activity between external envelope 27 and internal envelope 28. This latter envelope defines the external boundaries of the gain medium volumetric region corresponding to the pulse mode of laser beam 7.

For this embodiment, at least, the CW and pulsed regions in the gain medium are described as being substantially distinct. Nonetheless, those practicing in the art recognize that the boundary layer defined by lines 28, between the CW and pulse generating regions, is not step-like in its transition. Thus, extraction of energy by the transmission of a pulse will slightly deplete the CW region. This post-pulse phenomenon is represented in the time plot of FIG. 2 by dip 29 in the CW level immediately following the cessation of the pulse.

Waist 31 is attributable to imperfections in refocusing gain medium energy. The effect is fairly well recognized.

Figure 8:
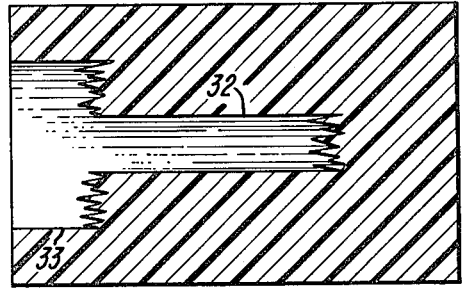
FIG. 8 is a cross-sectional block to show a typical burn pattern.

FIG. 8 contains a block, cross-sectioned to show the interacting effects of the CW and pulsed modes in the laser beam. Again the pattern represented by FIG. 3 is selected. As is evident from FIG. 8, concentric cylindrical cavities are burned into the target block with volume 32 attributable to the pulsed mode and volume 33 a product of the CW mode.

Redirecting attention to the patterns described with reference to FIGS. 3-5, and the optical organization in FIG. 7, a requirement for pattern symmetry appears. Namely, if the CW and pulsed volumetric regions of the gain medium are to remain substantially decoupled, reflections from opposite ends of the medium, for each mode, must not interact. Using the pattern in FIG. 5 as an example, this symmetry requires a bisection line, such as dashed line 34, through any area of transitional material to produce mirror image patterns on either side thereof.

Figure 9:
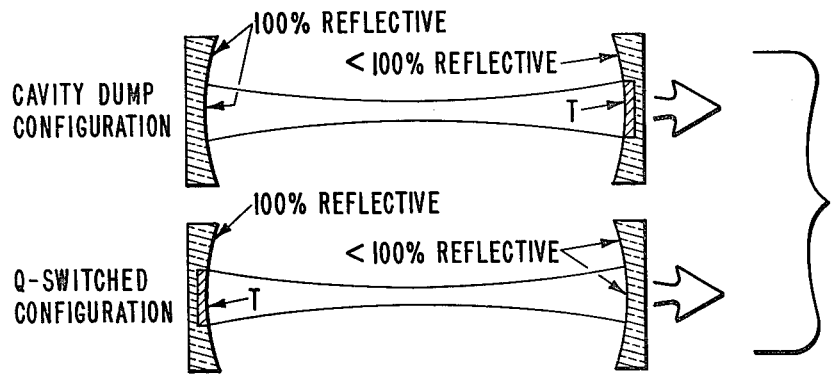
FIG. 9 schematically depicts the contrasts of the cavity dumped and Q-switched configurations for central area pulsing.

The foregoing description has been directed toward the cavity dumped laser configuration. The fundamental concepts disclosed are not so limiting. Consider FIG. 9 where the Q-switched configuration is schematically shown adjacent to its cavity dumped counterpart.

The areas designated T contain transitional material, while those shown to have less than 100% reflectivity are the conventional output coupling devices. In the case of the cavity dumped configuration, the pulsed laser beam eminates from the gain medium when the transition material moves from its reflective state to its transmissive state. The Q-switched configuration is otherwise in that a transition from transmissive to reflective states initiates the laser beam output pulse.

Those practicing in the art will undoubtedly recognize the need for a continuous rather than pulsed energy pump if CW and pulsed laser operations are to be superimposed as taught herein.

I claim:

1. An apparatus for generating a spatially coherent laser beam having concurrent CW and pulsed modes, comprising:
    a. a gain medium;
    b. a means for continuously pumping said medium;
    c. a first reflective surface at a first end of said gain medium for optically terminating said gain medium, said first reflective surface having distinct areas for CW and pulsed operating modes;
    d. a second reflective surface at a second end of said gain medium, in the form of an output coupling having distinct areas for CW and pulsed operating modes, said second reflective surface disposed oppositely to the said first reflective surface and defining an optical resonant cavity with said first reflective surface; and
    e. a transition material, at one of said ends of said gain medium, having selectively optically reflective and transmissive phases in response to an external stimulus.

2. The apparatus recited in claim 1, wherein said transition material is at the first end of said gain medium and defines the distinct area for the pulsed operating mode, and further where the pulsed operating mode area of said second end is partially transmissive.

3. The apparatus recited in claim 1, wherein said transition material is at the second end of said gain medium and defines the distinct area for the pulsed operating mode, and further where the pulsed operating mode area of said first end is substantially reflective.

4. The apparatus recited in claims 1, 2 or 3, wherein the first end area for the CW operating mode is substantially reflective and the distinct area of said second end for the CW operating mode is partially transmissive.

5. The apparatus recited in claim 4, wherein the mode areas are defined by concentric circles and the transition material is from a group consisting of VO, $VO_2$, $V_2O_3$, $V_3O_5$, $V_4O_7$, $V_5O_9$, $V_6O_{11}$, $V_7O_{13}$, $V_8O_{15}$, $Ti_2O_3$, $Ti_4O_7$, $NbO_2$, $FeSi_2$, $VO_2NbO_2$, $V_{1-x}Mo_xO_2$, $VO_2-TiO_2$, $V_2O_3-Ti_2O_3$, $V_{1-x}Ge_xO_2$, $V_{1-x}Nb_xO_2$, $V_{1-x}Cr_xO_2$, $(Cr_xV_{1-x})_2O_3$ and $V_{1-x}Ti_xO_2$.

6. The apparatus recited in claims 1, 2 or 3, wherein the transition material is from a group consisting of VO, $VO_2$, $V_2O_3$, $V_3O_5$, $V_4O_7$, $V_5O_9$, $V_6O_{11}$, $V_7O_{13}$, $V_8O_{15}$, $Ti_2O_3$, $Ti_4O_7$, $NbO_2$, $FeSi_2$, $VO_2NbO_2$, $V_{1-x}Mo_xO_2$, $VO_2-TiO_2$, $V_2O_3-Ti_2O_3$, $V_{1-x}Ge_xO_2$, $V_{1-x}Nb_xO_2$, $V_{1-x}Cr_xO_2$, $(Cr_xV_{1-x})_2O_3$ and $V_{1-x}Ti_xO_2$.

* * * * *